(12) United States Patent
Cronley

(10) Patent No.: US 8,070,188 B2
(45) Date of Patent: *Dec. 6, 2011

(54) QUICK-CONNECTING COUPLER FOR HOSES, PIPES AND FAUCETS

(76) Inventor: Gerald Cronley, Gretna, LA (US)

( * ) Notice: Subject to any disclaimer, the term of this patent is extended or adjusted under 35 U.S.C. 154(b) by 946 days.

This patent is subject to a terminal disclaimer.

(21) Appl. No.: 11/832,750

(22) Filed: Aug. 2, 2007

(65) Prior Publication Data

US 2008/0036208 A1     Feb. 14, 2008

Related U.S. Application Data

(63) Continuation of application No. 11/143,129, filed on Jun. 3, 2005, now Pat. No. 7,270,350.

(51) Int. Cl.
*F16L 35/00* (2006.01)

(52) U.S. Cl. .......... 285/331; 285/33; 285/305; 285/326; 285/406

(58) Field of Classification Search ............... 403/379.1, 403/379.6, 315, 320; 285/305, 325, 326, 285/331, 321, 403, 406, 81, 1, 314, 33, 34, 285/35; 411/437
See application file for complete search history.

(56) References Cited

U.S. PATENT DOCUMENTS

| | | | | |
|---|---|---|---|---|
| 1,019,000 A | * | 2/1912 | Watson | 285/406 |
| 3,973,791 A | * | 8/1976 | Porta et al. | 285/305 |
| 6,050,766 A | * | 4/2000 | Kies et al. | 411/437 |
| 7,270,350 B2 | * | 9/2007 | Cronley | 285/331 |

* cited by examiner

*Primary Examiner* — Daniel Stodola
*Assistant Examiner* — Jay Ripley

(57) ABSTRACT

A quick-connecting coupler for connecting hoses, connectors together or to a faucet or other water accessories that allows ease of use by anyone, including the elderly, the infirm, and those suffering from disabilities. The quick-connecting coupler has a first male-end and a second female end. The second female end is provided with of spaced-apart through-slots or opening for receiving therethrough a pair of forks or leg-sections of a yoke. Each of the pair of forks or leg-sections is provided with at least one interior-facing linear thread or rib for engaging with the male threads of the mating male end of another hose, or the like. The second female end of the coupler of the invention has a pair diametrically opposed cutouts through which portions of the linear threads or ribs are exposed, whereby these exposed portions of the threads or ribs may mate with corresponding portions of the male threads of the mating male end positioned in the second female end of the coupler for coupling the mating male end in the female end of the coupler.

5 Claims, 15 Drawing Sheets

QUICK-CONNECTING COUPLER FOR HOSES, PIPES AND FAUCETS

CROSS REFERENCE TO RELATED APPLICATION

The present application is a continuation of application ser. No. 11/143,129, filed on Jun. 3, 2005, and now U.S. Pat. No. 7,270,350.

BACKGROUND OF THE INVENTION

The present invention is directed to a coupler for connecting a male-end of one hose, tube, connector, faucet, and the like, to a female end of another hose, tube, connector, and the like. Examples of prior-art quick-connecting hose couplers are disclosed in Applicant's previous U.S. Pat. Nos. 5,503, 437; 5,788,289; and 6,786,516, and copending application Ser. No. 10/728,428 filed Dec. 8, 2003, and Ser. No. 10/746, 508 filed Dec. 29, 2003. It has, however, been learned that these quick-connecting couplers are difficult to use by the elderly or persons suffering from disabilities that affect their ability to grip and connect the couplers between mating ends of hoses and/or faucets, and the like. The present invention provides a quick-connecting coupler that allows ease of use by anyone, including the elderly, the infirm, and those suffering from disabilities.

SUMMARY OF THE INVENTION

It is, therefore, the primary objective of the present invention to provide a quick-connecting coupler for hoses, faucets, and the like, which is more easily used during connection and disconnection, whereby elderly, the infirm, and those suffering from disabilities may use it without difficulty.

It is also the primary objective of the present invention to provide such a coupler that utilizes a handle by which the quick-connecting coupler may be gripped and held, for ease of use and which is used for actually mounting the female end of the coupler to a male end inserted in the female end of the coupler.

Toward these and other ends, the quick-connecting coupler of the invention has a first male end for connecting to a first female end of a hose, connector, tube, and the like, and a second female end for receiving a second male end of another hose, connector, faucet, and the like. Each of the first male end and second female end of the quick-connecting coupler of the invention is conventional in the sense that the second female end of the quick-connecting coupler is provided with an opening for receiving the second male end of another hose, or the like, and has a washer for sealing the connection. However, the second female end of the invention is different from the prior art in that it is provided with a pair of spaced-apart through-slots or openings for receiving therethrough the pair of forks or leg-sections of a mounting element. Each of the pair of forks or leg-sections is provided with at least one interior-facing linear thread or rib for engaging with the male threads of a mating male end. The second female end of the coupler of the invention has a pair diametrically-opposed cutouts through which portions of the linear threads or ribs are exposed, whereby these exposed portions of the threads or ribs may mate with corresponding portions of the threads of the mating male end positioned in the second female end of the coupler. The exposed portions of the linear threads engage with the male threads of the mating male end positioned in the female end of the coupler, whereby the second female end of the coupler is mounted onto the mating male end positioned therein and sealed thereto via a washer. The linear ribs of the pair of forks or leg sections of the mounting element may be provided at a slope or pitch matching that of the male threads, or, alternatively, may have no slope or pitch. Each fork or leg section may also be provided with a plurality of linear threads or ribs for engaging with the threads of the mating male end. As the forks are slid in the through-slots of the coupler at the female end thereof, the sloping threads, through wedging or camming action, force the male end against the sealing washer in the female end of the coupler, to sealingly lock the male end therein.

BRIEF DESCRIPTION OF THE DRAWING

The invention will be more readily understood with reference to the accompanying drawings, wherein:

FIG. 14 is a longitudinal cross-sectional view of anther embodiment of the invention where only a female end is provided which, in combination with the coupling yoke of FIG. 5, is used as a nut for securing a threaded bolt, screw, and the like; and FIG. 15 is a side elevation view of the embodiment of FIG. 14 shown in combination with the yoke of FIG. 5, where the combination of the female end of FIG. 14 and the yoke serves as a nut for a bolt, screw, and the like.

DETAILED DESCRIPTION OF THE INVENTION

Figure 1:
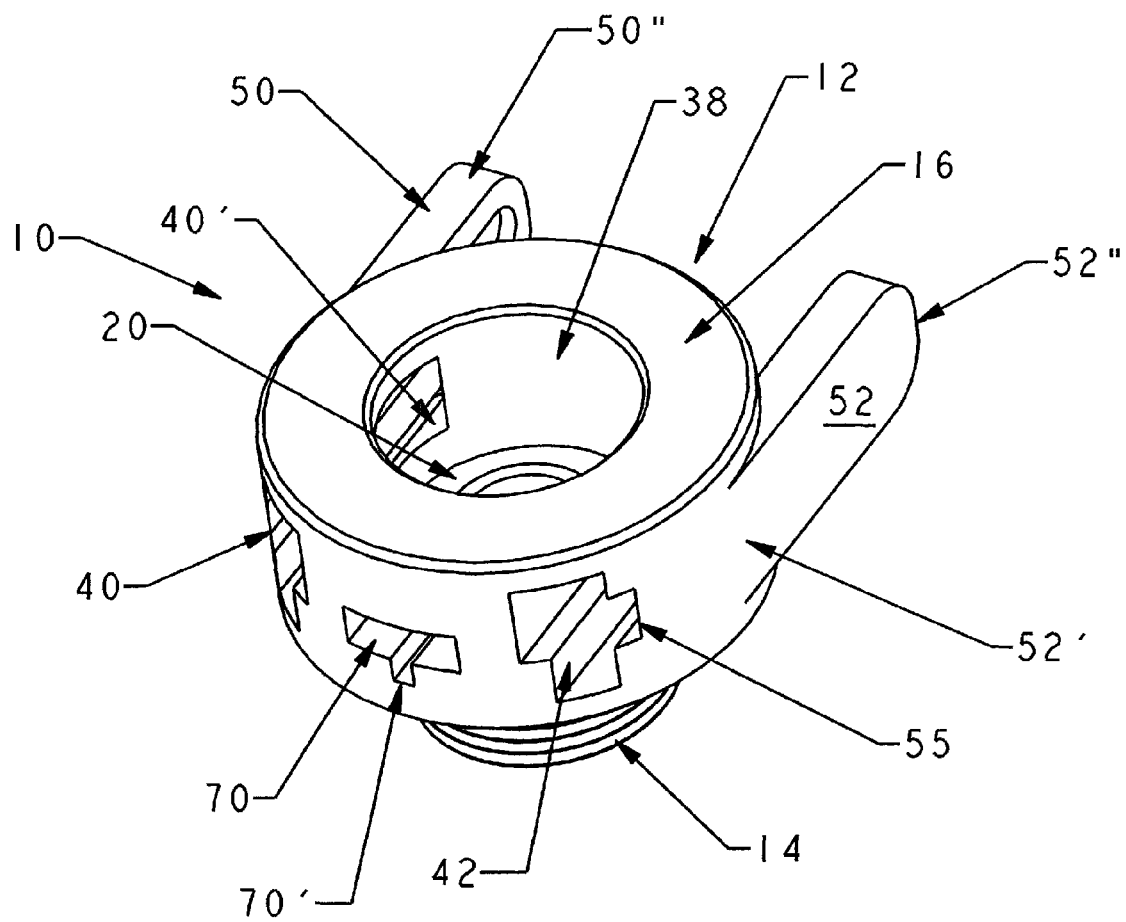
FIG. 1 is an isometric assembly view showing the first embodiment of the quick-connecting coupler of the invention.
Figure 2:
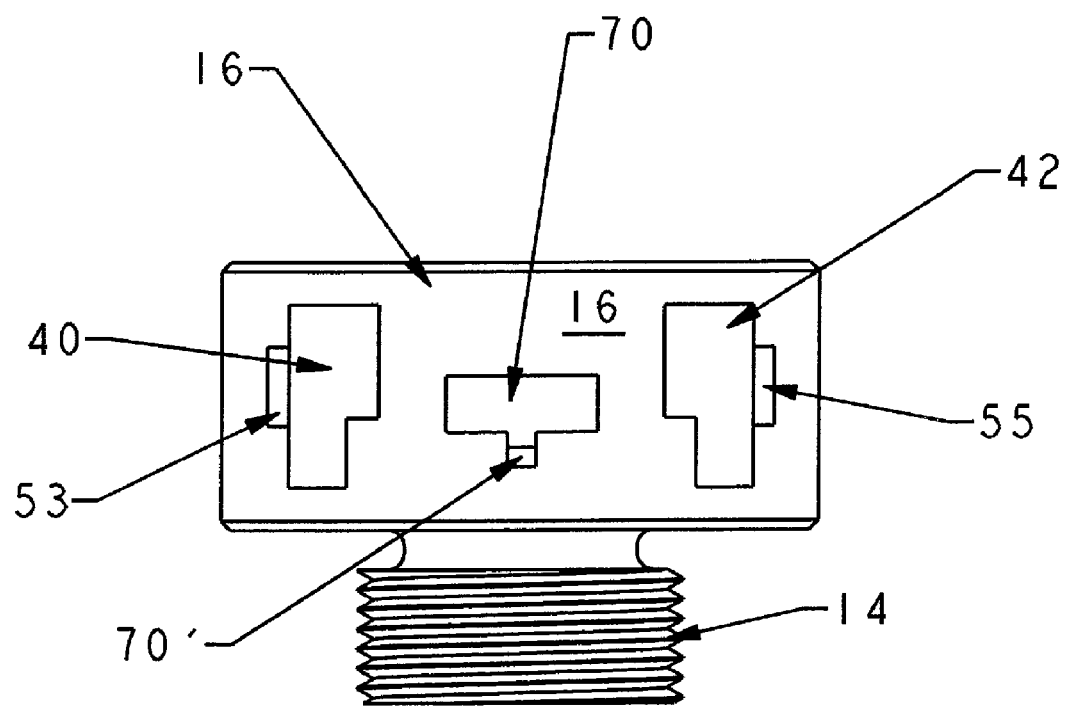
FIG. 2 is a front elevational view thereof.
Figure 3:
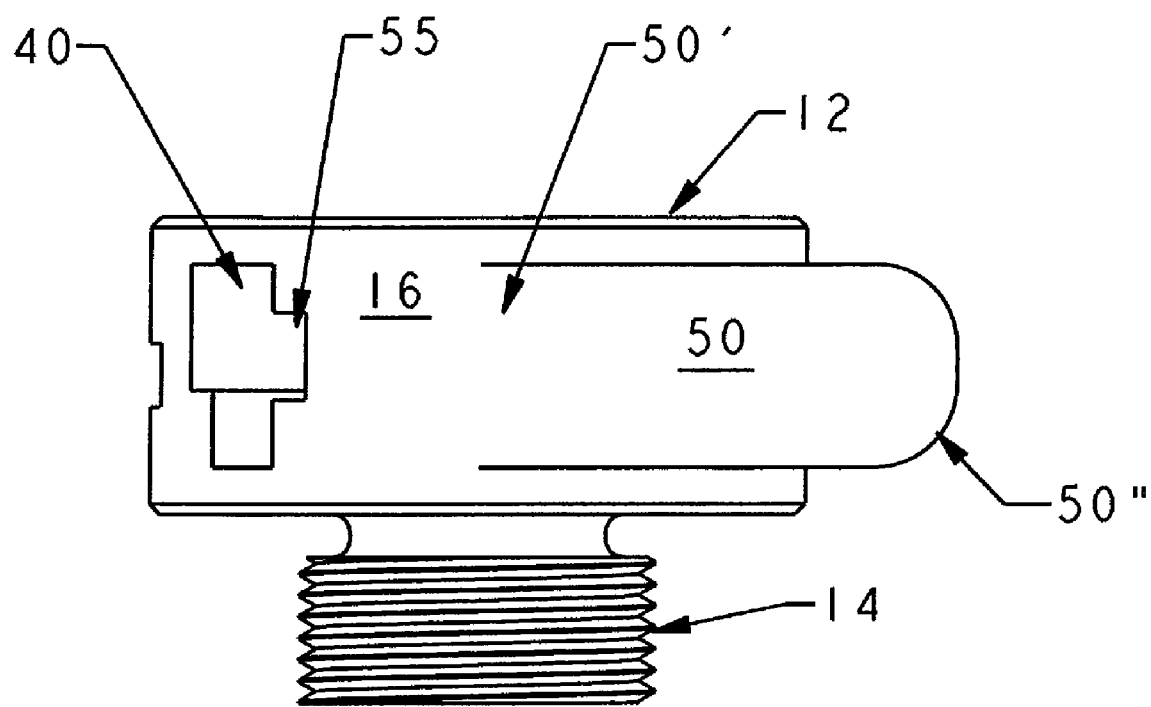
FIG. 3 is a side elevational view thereof.
Figure 4:
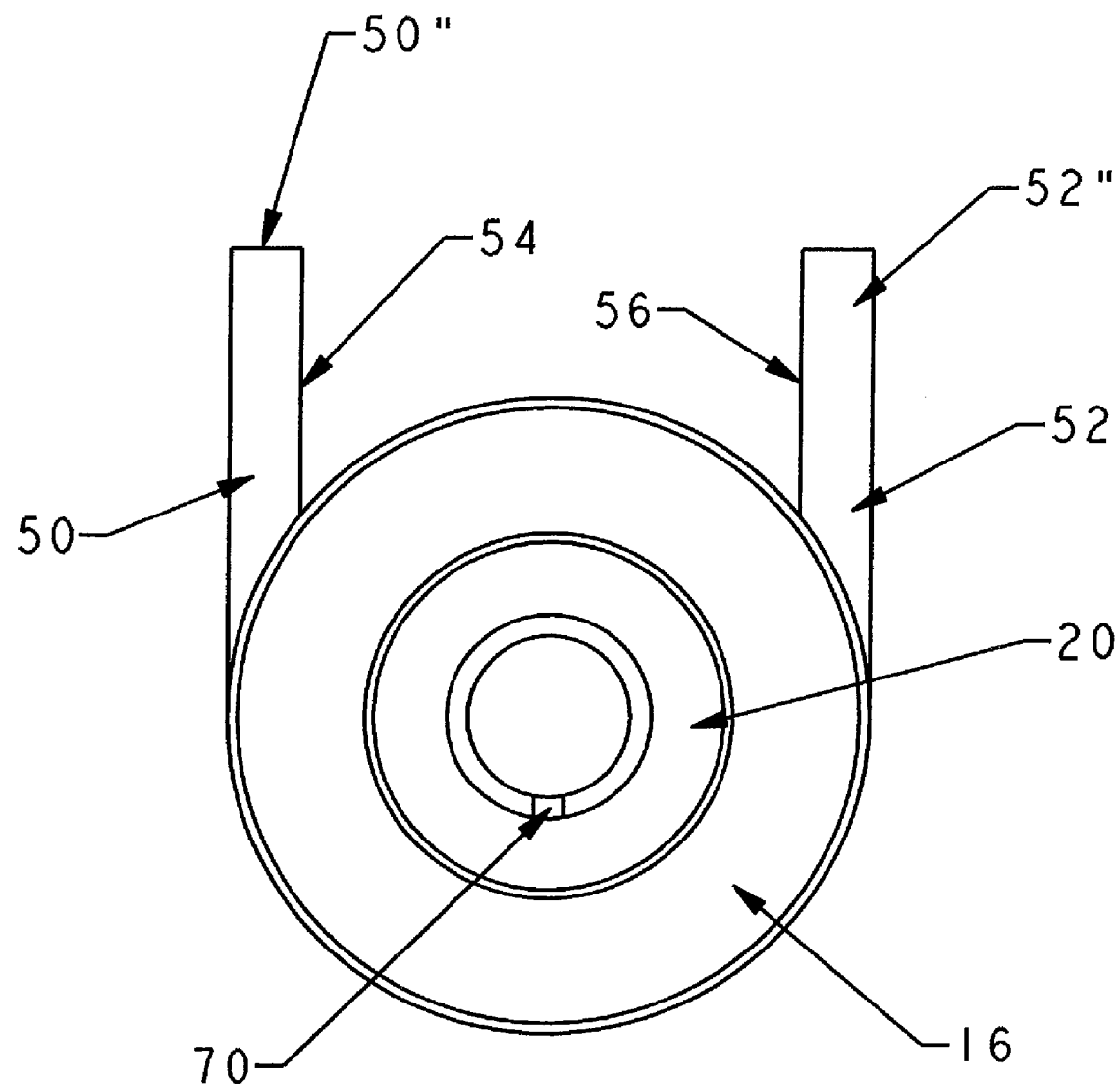
FIG. 4 is a top view thereof.

Referring now to the drawings in greater detail, and to FIGS. 1-10, there is shown in the preferred embodiment the quick-connecting coupler for coupling hoses, connectors, and the like, together or to a faucet, and the like, and is indicated generally by reference numeral 10. The coupler 10 has a circular cross-section, main body portion or housing 12 consisting of a first, threaded male end 14 for connecting to a female end of a hose, connector, and the like, and a second, female end 16 for receiving therein a mating, threaded male end of another hose, connector, faucet, or the like. The second female end 16 is of larger diameter than the male end 14, with both ends 14 and 16 defining a hollow interior for the flow of fluid therethrough. The female end 16 is provided with a seat 16' (FIG. 13) for a sealing washer, o-ring, or other equivalent sealing element, 20 for providing a seal for the connection between the female end 16 and a mating male end inserted therein, in the conventional manner.

The female end 16 has no interior threads itself that can mate with the threads of a male end inserted therein. Instead, in accordance with the invention, a separate and slidable mounting element or part 22 (FIGS. 5-8) is used for providing interior threads that mate with the threads of the male end inserted in the female end 16. The mounting element 22 consists of a yoke 24 having a handle section 26, and a forked section 28 defining a pair of spaced-apart fork elements or leg-sections 30, 32. Each fork element 30, 32 has a free or cantilevered end 30', 32', and an interior surface 30", 32" (FIG. 7), on which is provided or formed at least one toothed bar or linear thread 34, 36, respectively. In the preferred embodiment, preferably a plurality of parallel toothed bars or linear threads 34, 36, are provided, respectively, on each interior surface 30", 32", which plurality of threads 34, 36 are spaced apart the requisite distance from each other for matching the pitch of the male threads of a male end to be inserted into the female end 16. The threads 34, 36 extend along the respective interior surfaces 30", 32" for at least most of the length of the respective fork element 30, 32. Each of the toothed bars linear threads 34, 36, in the preferred embodiment, extends at a downwardly-extending slope or angle in the direction from the respective free ends 30', 32' toward the handle section 26 in order to expedite the connection of the coupler 10 to a mating male end inserted into the female end 16. The degree of slope or pitch of each of the toothed ribs or linear threads 34, 36 preferably matches that of the threads of a male end to be inserted into the female end 16, although it may differ.

Figure 5:
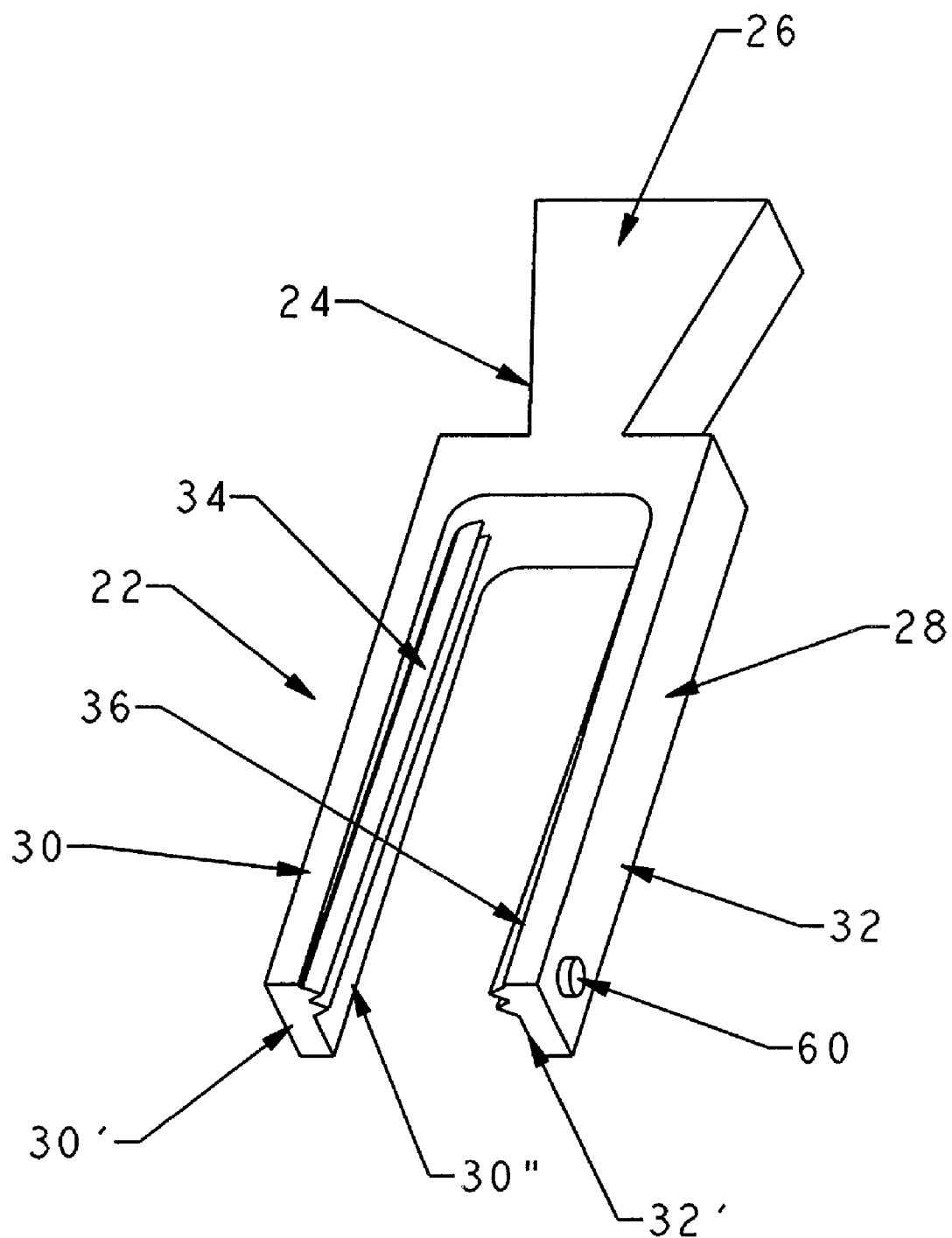
FIG. 5 is an isometric view of the coupling yoke with forked section for sliding in the coupler of FIG. 1 and used for engaging with the threads of an inserted male end.
Figure 6:
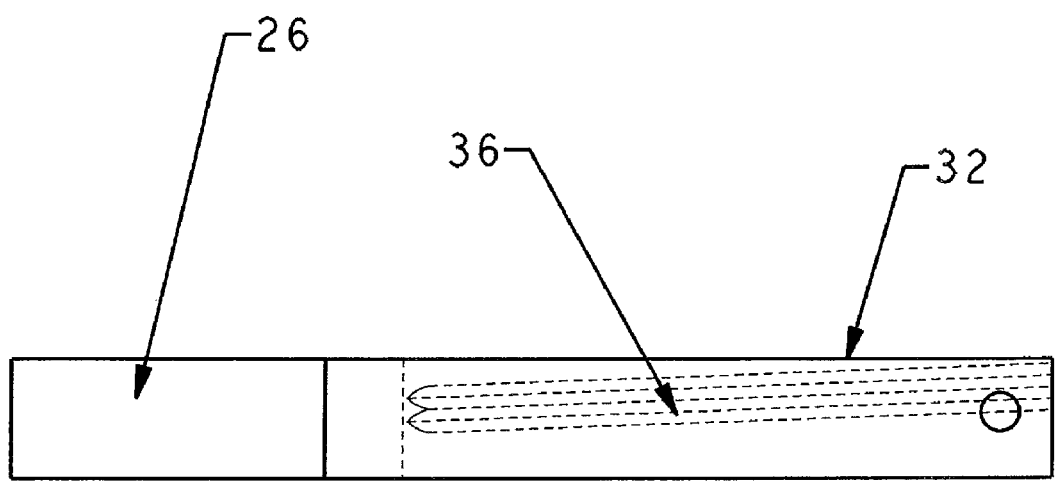
FIG. 6 is a side view of one of the fork-elements of the coupling yoke of FIG. 5.
Figure 7:
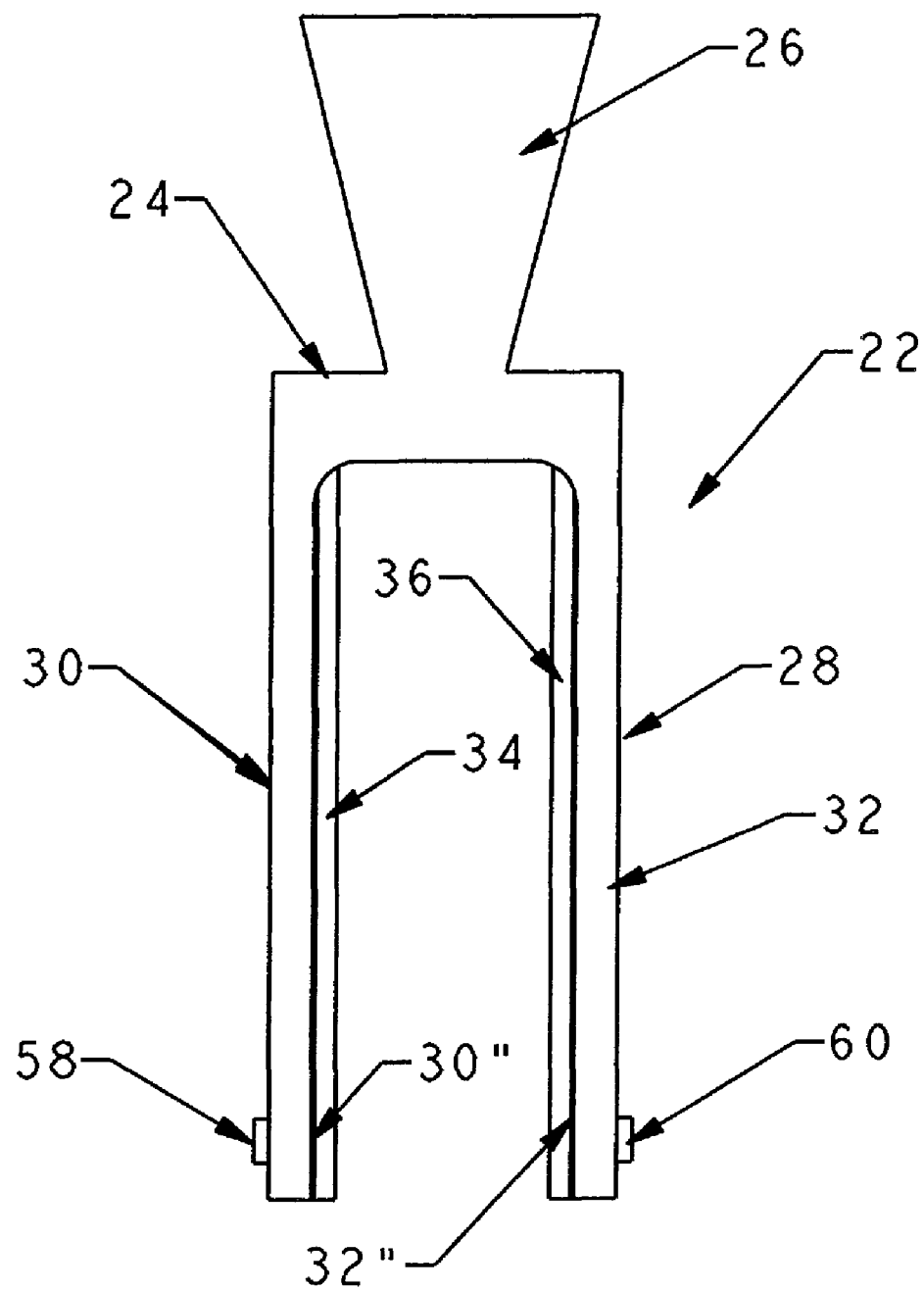
FIG. 7 is a top view of the coupling yoke of FIG. 5.
Figure 8:
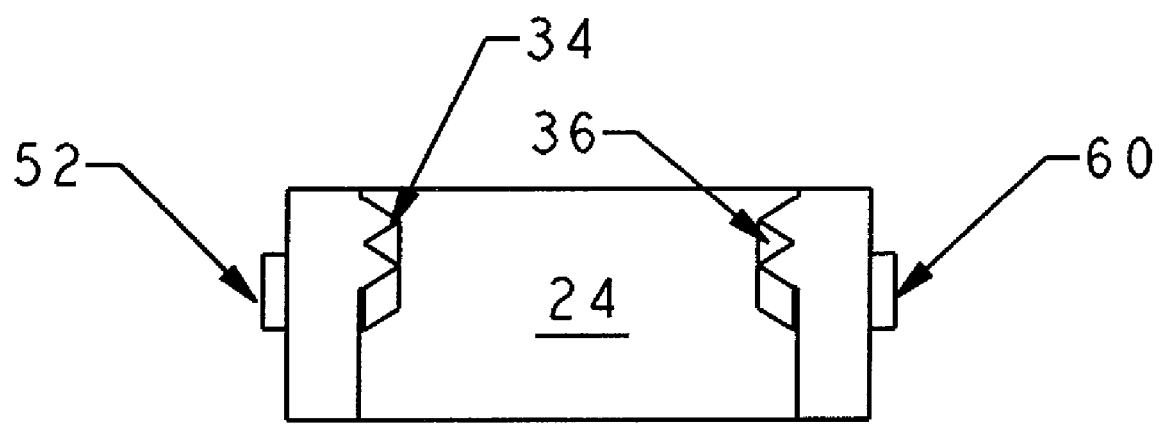
FIG. 8 is a front view of the coupling yoke of FIG. 5.
Figure 9:
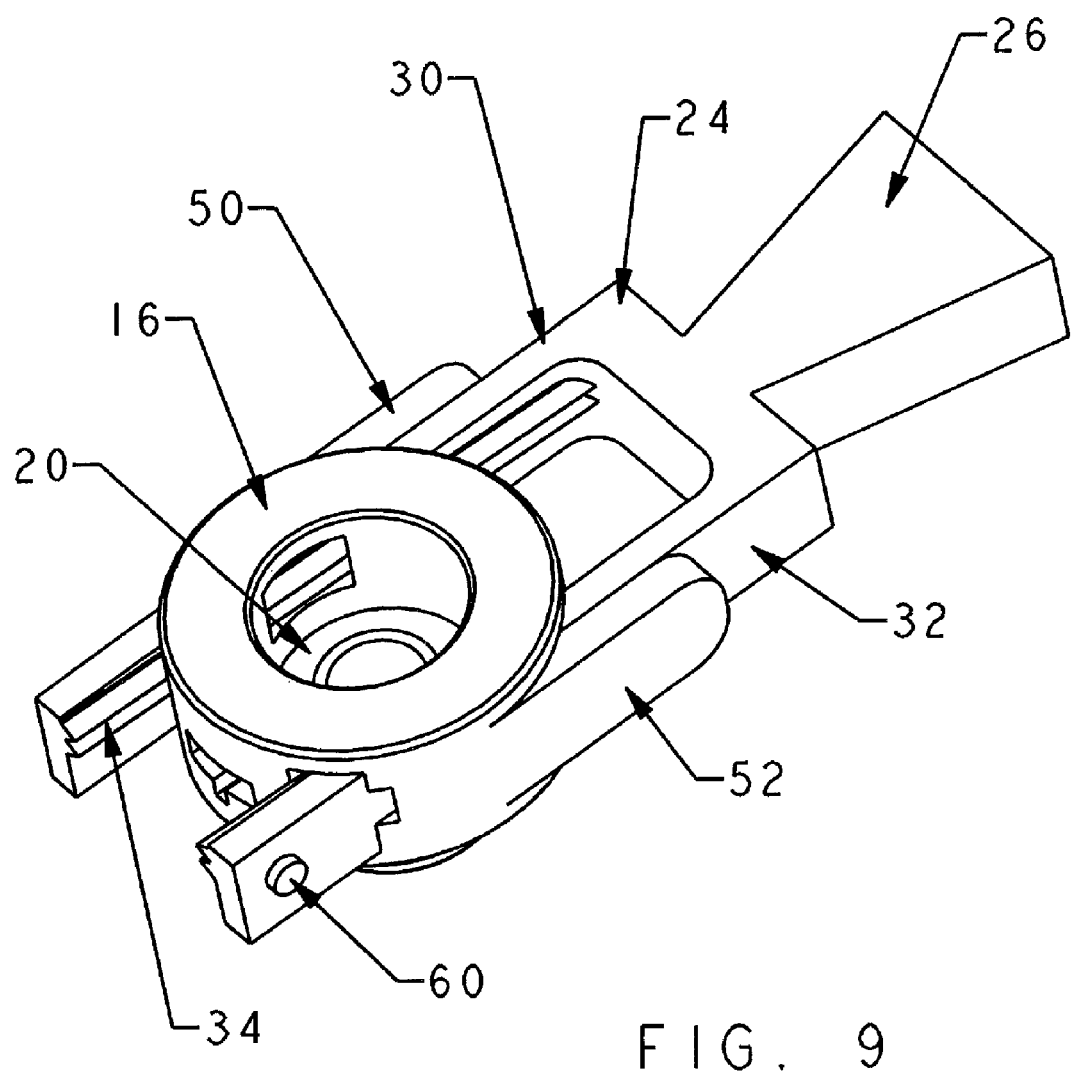
FIG. 9 is an isometric view showing the operating or engaged position of the coupling yoke of FIG. 5 in the coupler of FIG. 1 for locking a threaded male of a mating part in the female end of the coupler.

Referring to FIGS. 1-5, the housing 12 of the coupler 10 is provided with a pair of oppositely-disposed slots or channels 40, 42 in which, or through which, are received and slide the fork elements 30, 32. The slots or channels 40, 42 are located on diametrically-opposed portions thereof at the female end 16. With the fork elements 30, 32 inserted for sliding movement in the channels 40, 42, respectively, portions of the linear threads 34, 36 are exposed to the interior of the female end-portion via oppositely-disposed, interior cutout portions 40', 42' (best seen in FIG. 13) formed in the interior of the housing 12, as can be seen in FIGS. 1 and 5. These interior cutout portions are formed by arcuately cutting diametrically-opposed sections of inner circular wall 38 of the female end, which are arcuately extended enough of a distance such that the toothed ribs or linear threads 34, 36 project interiorly and radially inwardly into the interior of the female end, whereby the interiorly and radially inwardly projecting exposed portions of the linear threads 34, 36 may be described as defining chords of a circle, which circle that of the interior circular wall 38. These exposed portions of the linear threads project into the interior volume of the female end 16 by which they may engage with the threads of an inserted male end of a connecting hose, connector, faucet, or the like. In the preferred embodiment, the height of the channels 40, 42, as viewed in the vertical direction when viewing FIGS. 1 and 9, is greater that the height of the two forks 50, 52, also taken in the vertical direction when viewing FIGS. 1 and 8, so that there is provided a gap or space for vertically positioning the forks 50, 52 in the channels, as is clearly shown in FIG. 9, in order to vertically maneuver the forks so that the toothed ribs or threads 34, 36 may be aligned with and come into threaded engagement with the juxtapositioned portion of the threads of the male end inserted in the female end 16 and exposed thereat via the cutout portions 40', 42'. Depending upon how the male end is inserted in the female end 16, the exposed portion of the threads of the male end will be of different vertical location or elevation relative to the height of the channels 40, 42. This ensures that one may engage the linear threads with a portion of the threads of the male end inserted in the female end 16, so that the below-described camming effect for effecting sealing may occur, without any relative rotation of the coupler needed relative to the inserted male end. However, this gap need not provided, in the case of which relative rotation between the coupler 10 and the inserted male end may, in some circumstances, be required for effecting the seal, as described hereinbelow.

In the preferred embodiment, since the slope and pitch of the threads 34, 36 are approximately the same as that of the threads of a male end to be inserted into the female end-portion 16, one need not rotate the coupler 10 to attach and seal the female end to an inserted male end, but one need only push the fork section 28 of the mounting element 22 through the through-slots 40, 42, by which the pitched or downwardly sloping linear threads 34, 36 engage with the threads of the male end inserted in the female end-portion 16, and whereupon further sliding of the fork section in the through-slots 40, 42 causes the sloping linear threads to cam or wedge the male end inserted into the female end-portion against the sealing washer 20, without any need of causing relative rotation between the male end inserted in the female end-portion 16 and the female end 16 itself.

As explained above, the linear threads 34, 36 preferably have a slope approximately equal to the slope and pitch of the threads of the male end to be inserted into the female end 16, whereby any relative rotation between the male end inserted in the female end-portion 16 and the female end 16 is not needed in order to connect the male end in the female end 16. However, it is within scope and purview of the invention to provide linear threads 34, 36 that have a slope that is different from that of the threads of the male end to be inserted into the female end 16. Thus, the slope of the linear threads 34, 36 may be steeper that that of the threads of the male end to be inserted into the female end-portion 16, whereby greater force would be required to seal a male end in the female end 16 against the washer 20. Alternatively, the slope of the linear threads 34,36 may be shallower than that of the threads of the male end to be inserted into the female end 16, whereby less force would be required to seal a male end in the female end-portion against the washer 20, in which case longer linear threads 34, 36 may required along with the concomitant lengthening of the mounting element 22. It is also possible to provide non-sloping or horizontal linear threads 34, 36, whereby relative rotation between the female end 16 and the male end inserted therein may be required for forcing and retaining the inserted male end against the washer 20. In this instance, by rotating the female end-portion via the handle-section 26, the exposed portions of the linear threads mate with the threads of the inserted male end, drawing the inserted male end inwardly into the interior hollow volume of the female end-portion, until the end of the inserted, mating male end seats against the sealing washer 20, whereby a sealed connection is achieved. It is, also, noted that in all variations of the slope of the linear threads 34, 36, one may, if desired, also rotate the female end-portion 16 relative to the inserted male end in order to achieve in an even tighter seal against the washer 20, if necessary.

Figure 10:
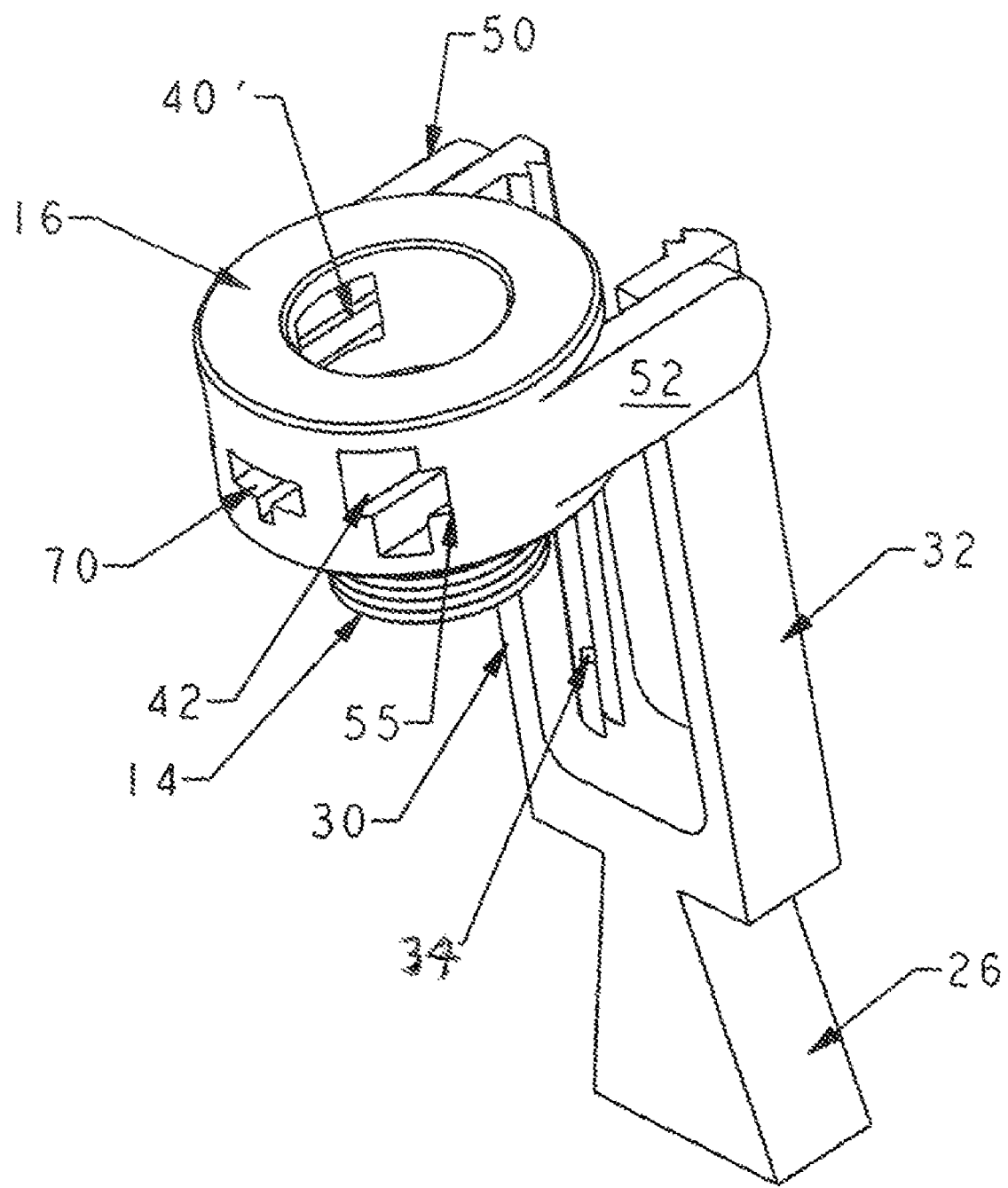
FIG. 10 is an isometric view showing the disengaged position of the coupling yoke of FIG. 5 in the coupler of FIG. 1 after a threaded male of a mating part in the female end of the coupler has been released and removed from the female end of the coupler.

The main body portion housing 12 is also provided with a pair of diametrically-opposite, tangential flanges or arms 50, 52 located at the entrance to the through-slots 40, 42, respectively. Each flange 50, 52 has a first end 50', 52', adjacent a respective entrance to the channels 40, 42 and a cantilevered, or free, end 50", 52", with each flange defining an interior-facing inner surface 54, 56, respectively, in which is formed a guide slot or groove. The surface wall of each channel 40, 42, respectively, is also formed with a groove or slot 53, 55 (FIG. 2) matching, and in alignment with, the grooves in the interior-facing grooves of the flanges 50, 52, whereby one elongated guide slot or groove 54' or 56' is provided. Each guide groove or slot 54', 56' slidingly receives therein a guide pin or post 58, 60, respectively, projecting outwardly or exteriorly from a respective free or cantilevered end 30', 32', of a fork element 30, 32. The guide pins retain the fork elements 30, 32 in the slots 54', 56', with the closed ends of the slots 54', 56' serving as a stop for the guide pins for preventing the forked section 28 from exiting from the channels 40, 42, whereby the mounting element 22, with the yoke 24, handle section 26, and a forked section 28 thereof, remain attached to the female end 16 of the housing 12 (FIGS. 9 and 10). Moreover, as can be seen in FIG. 10, when the coupler 10 of the invention is not being used, the mounting element 22 may be slid in a direction away from the coupler 10, until the guide pins 58, 60 abut against the closed ends of the slots in the flanges 54, 56, thereby acting as stops thereagainst. In this limit position, the guide pins 58, 60 also serve as hinges or pivot pins, by which the mounting element 22 may be pivoted or rotated 90 degrees, until it is at a right angle with respect to the longitudinal axis of the coupler 10, whereby easier storage of the device is made possible. When the mounting element 22 is needed to be used again, one simply rotates or pivots it in the opposite direction whereby its length is substantially co-extensive with the longitudinal axis of the coupler 10, in the manner described above during the use of the coupler 10. The coupler 10 is, also, preferably provided with a T-shaped drain vent or drain channel 70 having a base channel section 70' through which water pressure is relieved during initial disconnection of the mating parts, so as prevent unwanted spraying or water jets when disconnecting the inserted male end from the female end 16. This vent or drain may be located anywhere, but, as shown in, is preferably near or adjacent the sealing washer 20. By locating this vent at the sealing washer, when the coupler 10 is in use, the "piston-effect" similar to that disclosed in applicant's U.S. Pat. No. 5,788,289, is not created, whereby the sealing washer 20 is not urged or forced in the opposite direction to the flow of water, against the juxtapositioned end of the inserted male end. However, if such a piston-effect were desired, then the base channel section 70' may be eliminated.

When using the coupler 10 in order to connect a pair of hoses, connectors, and the like, together, or to a faucet or other water accessory, one first inserts the male end into the female end 16 of the coupler 10, until it is seated against the sealing washer 28. Then, the mounting element 22 is moved toward the coupler 10 so that the fork elements 30, 32 slide in the channels 40, 42 as guided by the guide pins 58, 60. As the forks slide, the sloping linear threads 34, 36 thereof, through camming or wedge action, cooperate with the threads of the male element inserted in the female end-portion 16, translating and forcing the male element against the sealing washer 28 with enough force so as to provide a water-tight seal. If additional tightening is desired or necessary, one may rotate the mounting element 22 via its handle, in order to rotate it and the attached coupler 10 relative to the inserted threaded male end.

Figure 11:
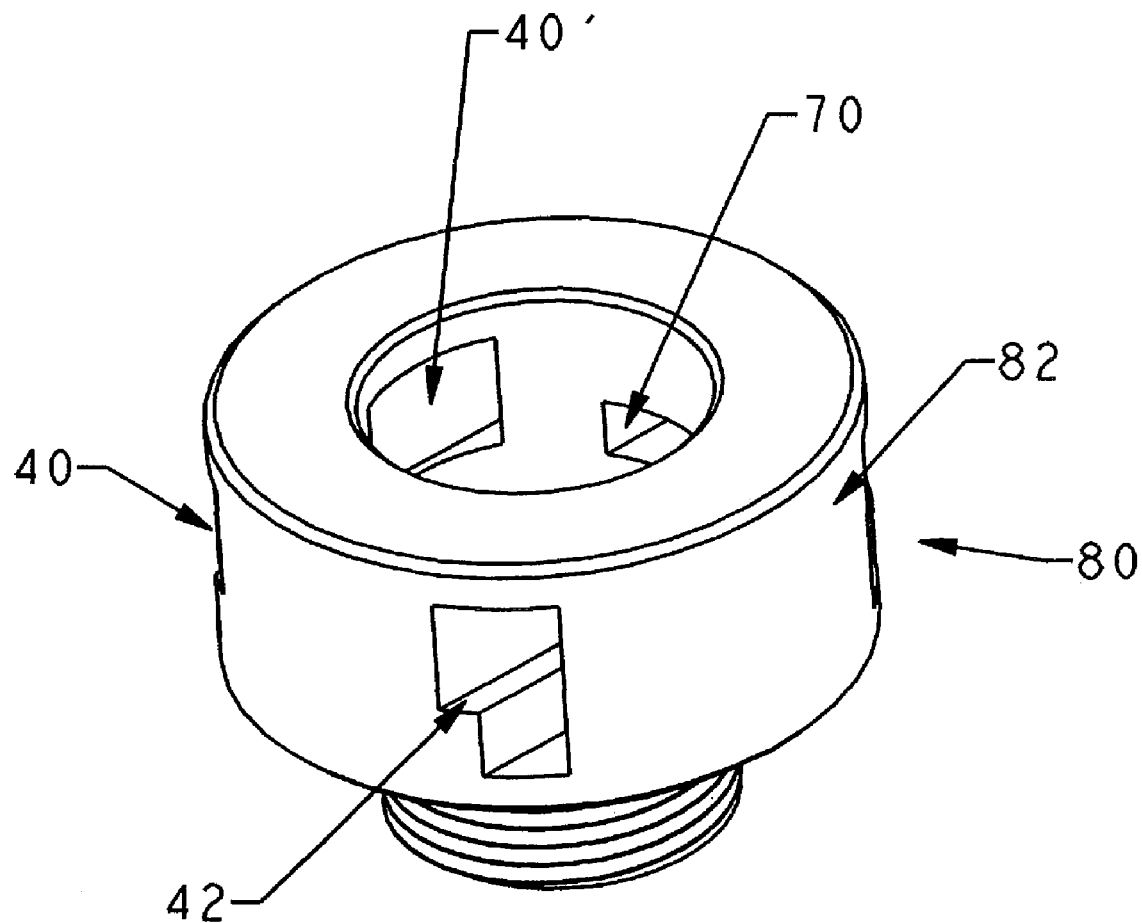
FIG. 11 is an isometric view of a modification of the coupler of FIG. 1.
Figure 12:
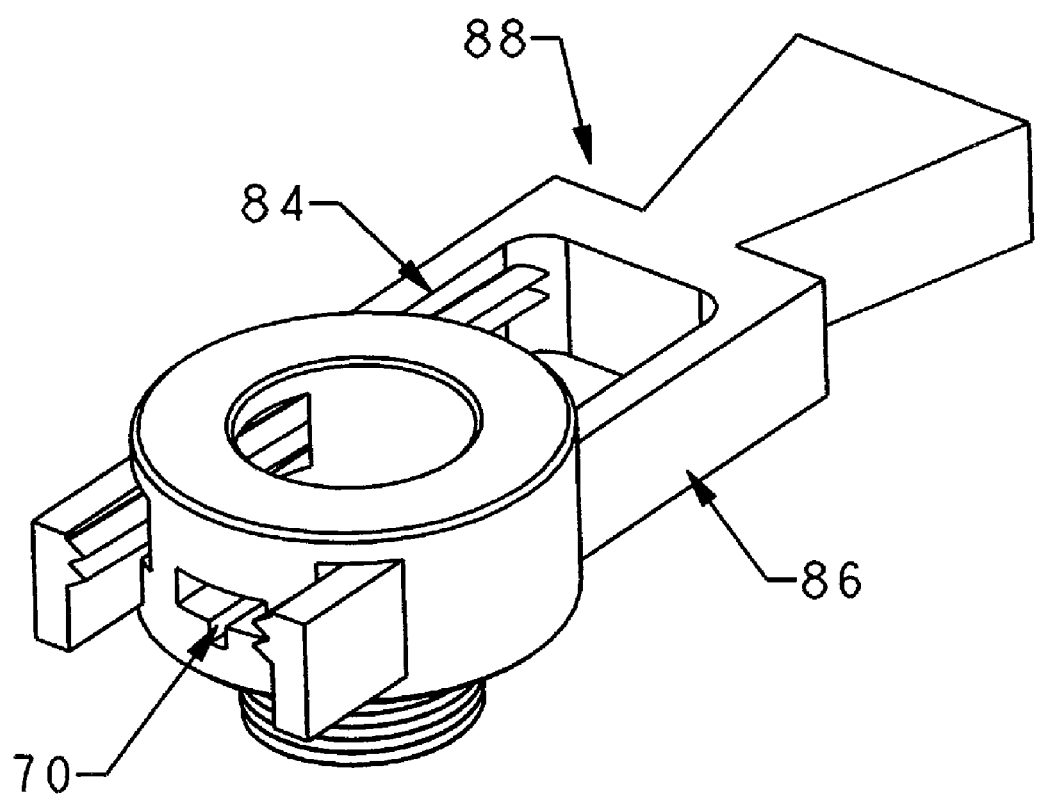
FIG. 12 is an isometric view similar to FIG. 9 and showing the operating or engaged position of a modified coupling yoke for use in the coupler of FIG. 11 for locking a threaded male of a mating part in the female end of the coupler.
Figure 13:
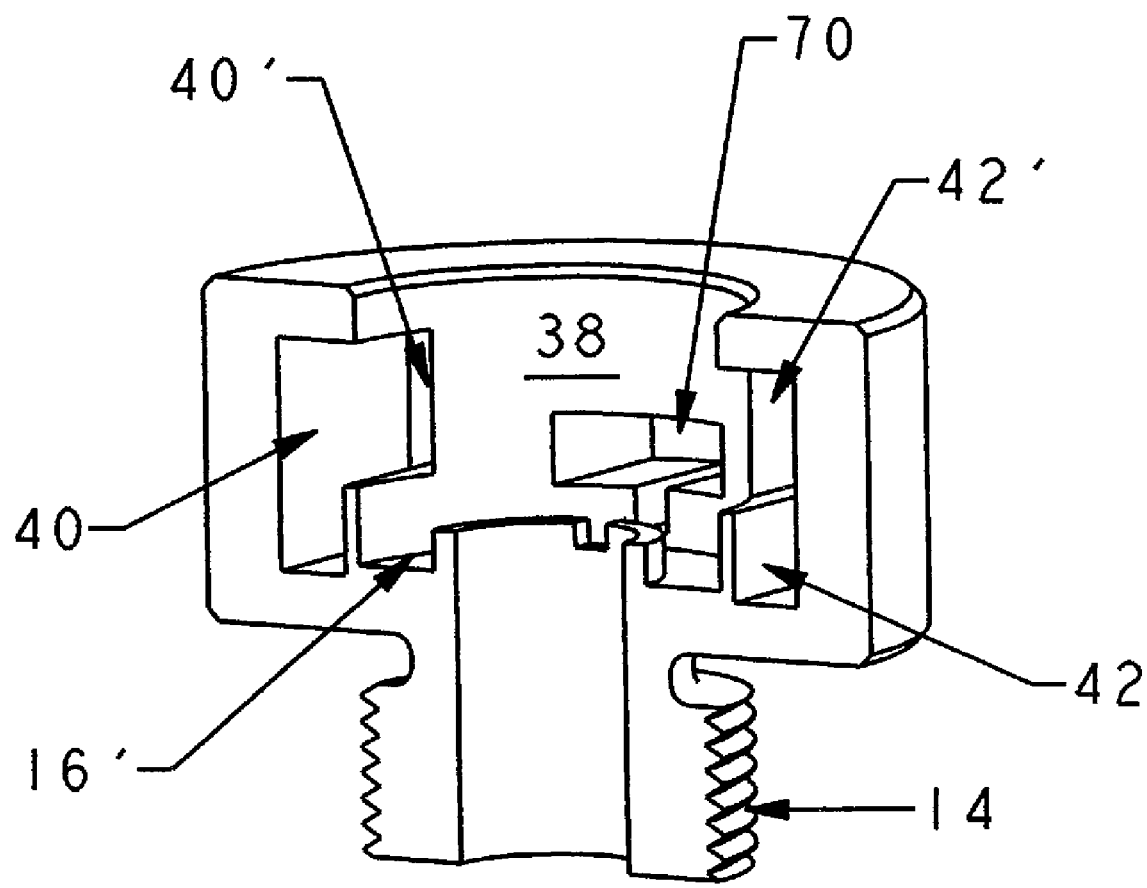
FIG. 13 is a vertical cross-section view of the coupler of FIG. 11 thereof.

Referring now to FIGS. 11-13, there is shown a modification of the coupler of the invention and indicated generally by reference numeral 80. The coupler 80 is substantially the same as the coupler 10 except that the housing 82 thereof is not provided with the flanges 50, 52 of the coupler 10, nor do the forks 84, 86 of the mounting element 88 thereof, which serves the same function as that of the mounting element 22 of the coupler 10, have the guide pins or stops 58,60 of the mounting element 22 of the coupler 10. Therefore, the mounting element 88 with its fork elements 84, 86 is completely removable and separable from the coupler 80 during non-use and storage.

While it has been described that the preferred embodiment utilizes downwardly sloping linear threads 34, 36 on the interior surfaces of the forks, they may made to extend horizontally without slope, whereupon, in order to connect the coupler to a male end, one may have to rotate the coupler relative to the inserted male end via the mounting element 22. It is also within the scope and purview of the invention to provide sloping linear threads 34, 36 that slope upwardly in a sense opposite to that shown in the drawings for the couplers 10 and 80. In this case, rotation of the coupler relative to the inserted male end via the mounting element 22 would be a requirement and would proceed by means of the cross-threading of the threads of the male end with the linear threads of the mounting element 22. In addition, even the case of the preferred embodiment, where the linear threads are downwardly-sloping and preferably at the same angle and pitch as the threads of the inserted male end, if, for some reason, the male end inserted into the female end of the coupler 10 is not properly aligned therein, the linear threads of the mounting element 22 will still secure and causing the sealing between the male end and the female end of the coupler by the cross-threading of the two parts, in which case relative rotation between the female end 16 and the male end inserted therein would be a requirement in order to effect the seal therebetween. Therefore, no matter what degree or sense of slope of the linear threads 34, 36 is provided, if cross-threading thereof with the outer threads of the male end inserted in the female end 16 were to occur, the seal may still be achieved by such relative rotation. Such relative rotation is achieved by gripping the handle section 26 of the mounting element 22 and turning.

While the preferred embodiment has been disclosed as being directed to a threaded male end to be inserted in the female end 16, the coupler 10 or 80 may also be used for receiving in its female end a grooved or flared male end, as described in applicant's U.S. Pat. No. 6,786,516. In this instance, there would only be required one linear thread 34, 36. Moreover, this one linear thread would be downwardly sloping, in the manner described above and shown in FIGS. 5-9.

It is also noted that under some limited circumstances, only one fork 30 or 32 need be provided. In this case, the other of the forks 30 or 32 could be dispensed with altogether, and the linear threads on the one remaining fork would engage with the threads of the inserted male end. In this case, the female end 16 would be made extra long with a longer cutout portion 40' or 42' being provided to expose a greater length of exposed linear thread or threads 34 or 36. In this case, only one channel 40 or 42, therefore, would need to be provided. Alternatively, both forks may be provided, but only one of them would be provided with the linear thread or threads.

The couplers 10 and 80 may be used, not only in liquid environment, but may also be used in fluid environments in general, such as pressurized gases, and the like. It is also possible to replace the male end 14 with a female end for thereby coupling together two male parts.

Figure 14:
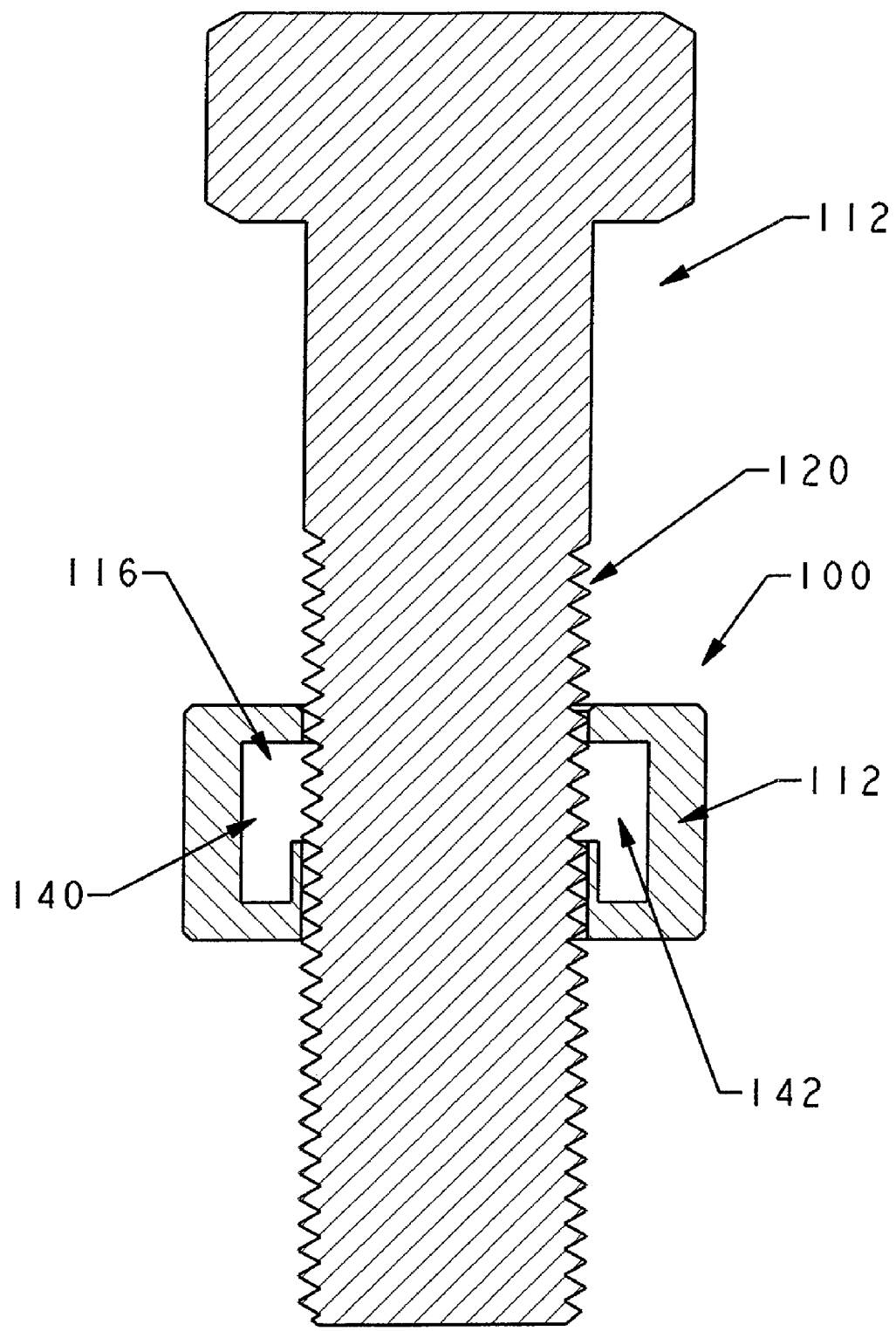
Figure 15:
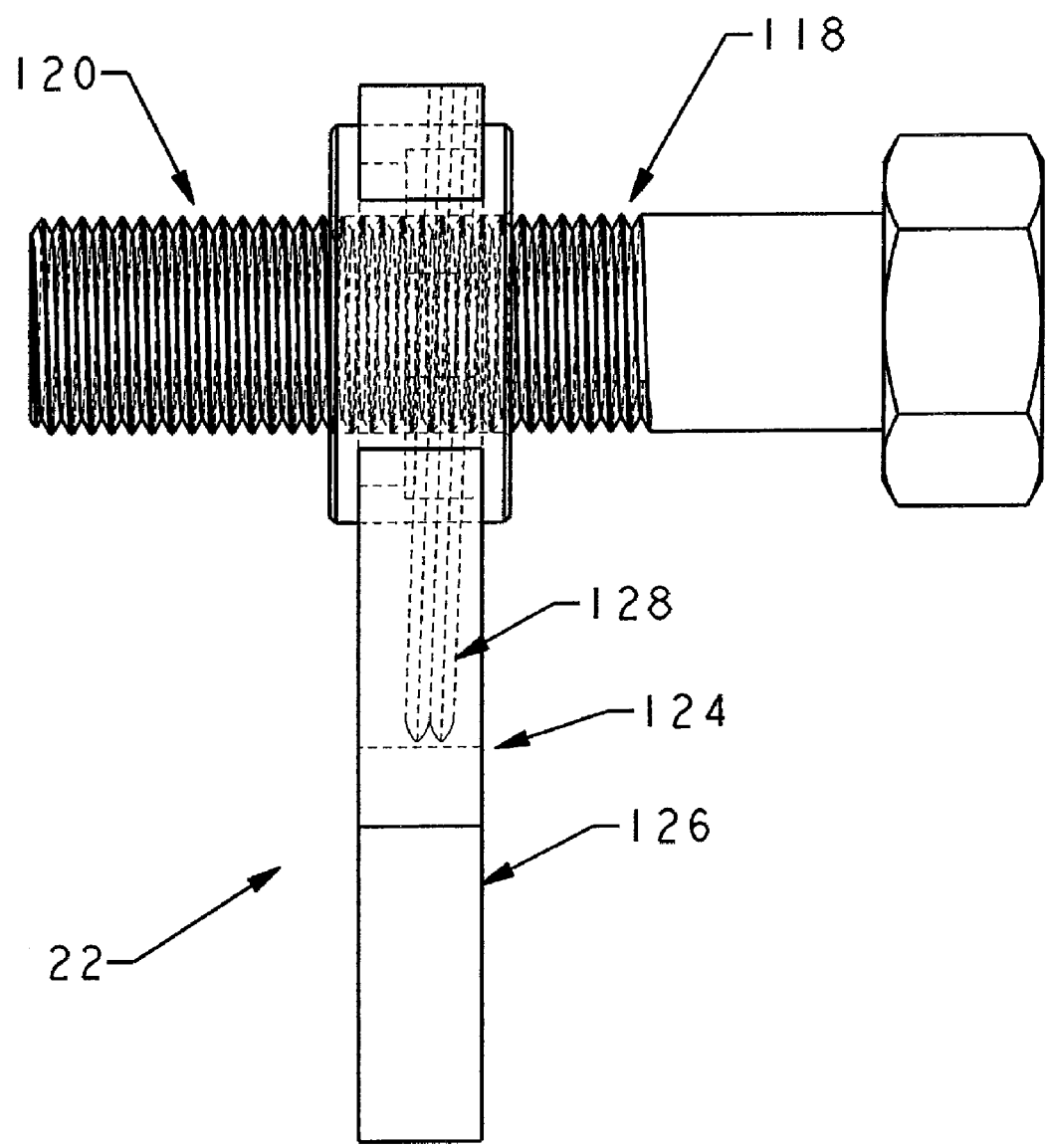

Referring now to FIGS. 14 and 15, there is shown another embodiment 100 of the coupler of the invention in which it is used as a "quick" nut for use with a threaded bolt, rod, screw, and the like, for serving as a temporary or semi-permanent nut. In this embodiment, only a female or receiving portion 116 is provided, and no male end. In this embodiment, the coupler 100 acts or serves as a nut for use with a threaded bolt, rod, screw, and the like. The female portion 116, since it not used in a fluid environment, does not have a sealing washer, but simply provides a passageway or hollow through-volume through which may pass the shaft 120 of a threaded bolt or screw 118. The female portion 116 is provided with a pair of channels 140, 142 similar to the channels 40, 42 of the embodiments of FIGS. 1-13, as well as oppositely-disposed, interior cutout portions (not shown) the same as the oppositely-disposed, interior cutout portions 40', 42' of the embodiments of FIGS. 1-13. The channels 140, 142 receive therethrough the forks of the mounting element 122 that is essentially identical to the mounting element 22 of the embodiments of FIGS. 1-13, and, therefore, consists of a yoke 124 having a handle section 126, and a forked section 128 defining a pair of spaced-apart fork elements or leg-sections. In use, the shaft 120 of a bolt or screw 118 is inserted through the opening of the coupler 100 until the desired portion of the shaft is located within the hollow interior of the coupler's female portion 116. Then, the forks of the forked section 128 of the mounting element 122 are slid through the respective channels 140, 142 of the coupler 100, whereupon the linear threads in the interior surfaces of the forks engage with the threads of the shaft 120, to thereby lock the coupler 100 to the shaft 120. The number, size, slope and pitch of the linear threads of the forks of the forked section 128 are identical to that described above with respect to the other embodiments, and operate in the same manner as described above for securing the coupler 100 to the bolt or screw 118.

An example of use of the coupler 100 as a nut for a bolt, rod, or screw, is as a quick-adjusting nut for use on miter frame clamps. These clamps utilize long lengths of threaded rod. Depending on the size of the work piece, the coupler 100 serving as a "quick" nut is adjustable to fit without requiring turning. The coupler 100 also works on a bench wood worker's vise and any vise or clamp that uses threads. The adjustment of these devices would be made with the "quick" nut of FIGS. 14 and 15 without requiring turning, or, if turning of the coupler 100 serving as a "quick" nut is required, may be achieved via the handle 126. In addition, a C-clamp could be made by using the "quick" nut of FIGS. 14 and 15, where the C-clamp is made up of a long piece of threaded bolt. The bolt is slid back and forth to the desired opening, and then the forks of the forked element 128 is slid in to tighten. The "quick" nut of FIGS. 14 and 15 would, also, work with a long piece of an all-threaded rod. Instead of conventionally screwing a nut onto 8" or 10" all-thread rod, with the coupler 100, one simply pushes on the female portion 116 to the desired placement, and then installs the forks of the forked element 128 for a tight fit.

It is also noted, as described above with regard to the other embodiments, that under some limited circumstances, only one fork need be provided. In this case, the other of the forks could be dispensed with altogether, and the linear threads on the one remaining fork would engage with the threads of the threaded shaft of the bolt, rod, or screw. In this case, the female or receiving portion would be made extra long with a longer cutout portion being provided to expose a greater length of exposed linear thread or threads. In this case, only one channel 140 or 142, therefore, would need to be provided. Alternatively, both forks may be provided, but only one of them would be provided with the linear thread or threads.

While specific embodiments of the invention have been shown and described, it is to be understood that numerous changes and modifications may be made therein without departing from the scope and spirit of the invention as set forth in the appended claims.

What is claimed is:

1. In a fluid coupler for coupling a male end into a female end, said coupler comprising a main housing having a first male end for connecting to a female end of a mating element, and a second female end having a main wall consisting of an inner circular wall portion interiorly of which is defined a hollow interior for receiving therein a threaded mating male end having a series of sloping threads, and a sealing washer operatively associated with said second female end for providing a fluid seal, the improvement comprising:

a mounting element for engaging with the sloping threads of a mating male end inserted in said second female end;

said mounting element comprising a pair of spaced-apart fork elements, each said fork element having an elongated interior surface facing the elongated interior surface of the other said fork element;

at least one sloping elongated linear thread element formed in each said elongated interior surface for engaging with the sloping threads of a mating male end inserted in said second female end and on opposite sides thereof;

said main wall of said second female end comprising a pair of diametrically-opposed channels for sliding therethrough said pair of spaced-apart fork elements, a respective said fork element being slidingly received in a respective one of said pair of diametrically-opposed channels;

said main housing further comprising a pair of diametrically-opposed, interior cutout portions that cooperate with the hollow interior of said pair of diametrically-opposed channels and with said hollow interior of said second female end, a respective one of said pair of diametrically-opposed, interior cutout portions being associated with a respective one of said diametrically-opposed channels, said pair of diametrically-opposed, interior cutout portions exposing said at least one sloping elongated linear thread element of each of said pair of fork elements to said hollow interior of said second female end;

said interior cutout portions being arcuate-cutout sections of said inner circular wall portion of said second female end, each said interior cutout portion extending arcuately such that a portion of a respective said at least one sloping elongated linear thread element projects interiorly and radially inwardly through a respective said interior cutout portion into the interior of said second female end;

each said fork element comprising a first end and a second cantilevered end; each said at least one elongated linear thread element sloping downwardly in a direction from said second cantilevered end toward said first end; said elongated linear thread elements being capable of wedging a male end inserted in said second female end as said fork elements are slid in said channels.

2. The coupler according to claim 1, wherein said at least one sloping elongated thread element of each said elongated interior surface comprises a plurality of sloping elongated linear threads having a pitch substantially equal to that of the sloping threads of a male end inserted in said second female end.

3. The coupler according to claim 1, wherein said channels have a height greater than that of said fork elements in order to provide maneuverability to said fork elements in said channels for aligning said sloping elongated linear thread elements with sloping threads of a male end inserted in said second female end located thereat.

4. A quick-connecting coupler for coupling one threaded male end of a first part to another threaded portion of a second part, comprising:
- a main housing having a first end for connecting to a portion of a second part, and a second female end defining a hollow interior for connecting to a threaded male end of a first part, and a sealing element operatively associated with said second female end for providing a fluid seal;
- a mounting element for engaging with a threaded male end of a first part to be inserted in said second female end;
- said mounting element comprising a pair of spaced-apart fork elements, each said fork element having of an elongated interior surface facing the elongated interior surface of the other said fork element;
- at least one sloping thread-engaging element formed in each said elongated interior surface for engaging with a threaded male end of a first part to be inserted in said second female end;
- said second female end comprising a main wall having an inner circular wall portion interiorly of which is defined said hollow interior for receiving therein a mating male end, and a pair of diametrically-opposed channels formed in said main wall for sliding therein said pair of spaced-apart fork elements, a respective said fork element being slidingly received in a respective one of said pair of diametrically-opposed channels;
- said second female end further comprising a pair of diametrically-opposed, interior cutout portions formed in said inner circular wall portion that cooperate with the hollow interior of said pair of diametrically-opposed channels and with the hollow interior of said second female end, a respective one of said pair of diametrically-opposed, interior cutout portions being associated with a respective one of said pair of diametrically-opposed channels, each of said pair of diametrically-opposed, interior cutout portions exposing a respective said at least one sloping thread-engaging element to said hollow interior of said second female end;
- said pair of spaced-apart fork elements being spaced apart a distance such that the interior-most facing portions of said thread-engaging elements are spaced apart a lateral distance such that said thread-engaging elements project into the interior of said second female end when said fork elements are in said pair of diametrically-opposed channels for engaging with threads of a threaded male end inserted in said second female end;
- each said fork element comprising a first end and a second cantilevered end; each said at least one sloping elongated thread-engaging element comprising at least one linear thread sloping downwardly in a direction from said second cantilevered end toward said first end; each said at least one elongated linear thread camming a threaded male end to be inserted in said second female end when said fork elements are slid in said channels.

5. The coupler according to claim 4, wherein said channels have a height greater than that of said fork elements in order to provide maneuverability to said fork elements in said channels for aligning said thread-engaging elements with a male end.

* * * * *